INVENTOR
F. C. Reggio

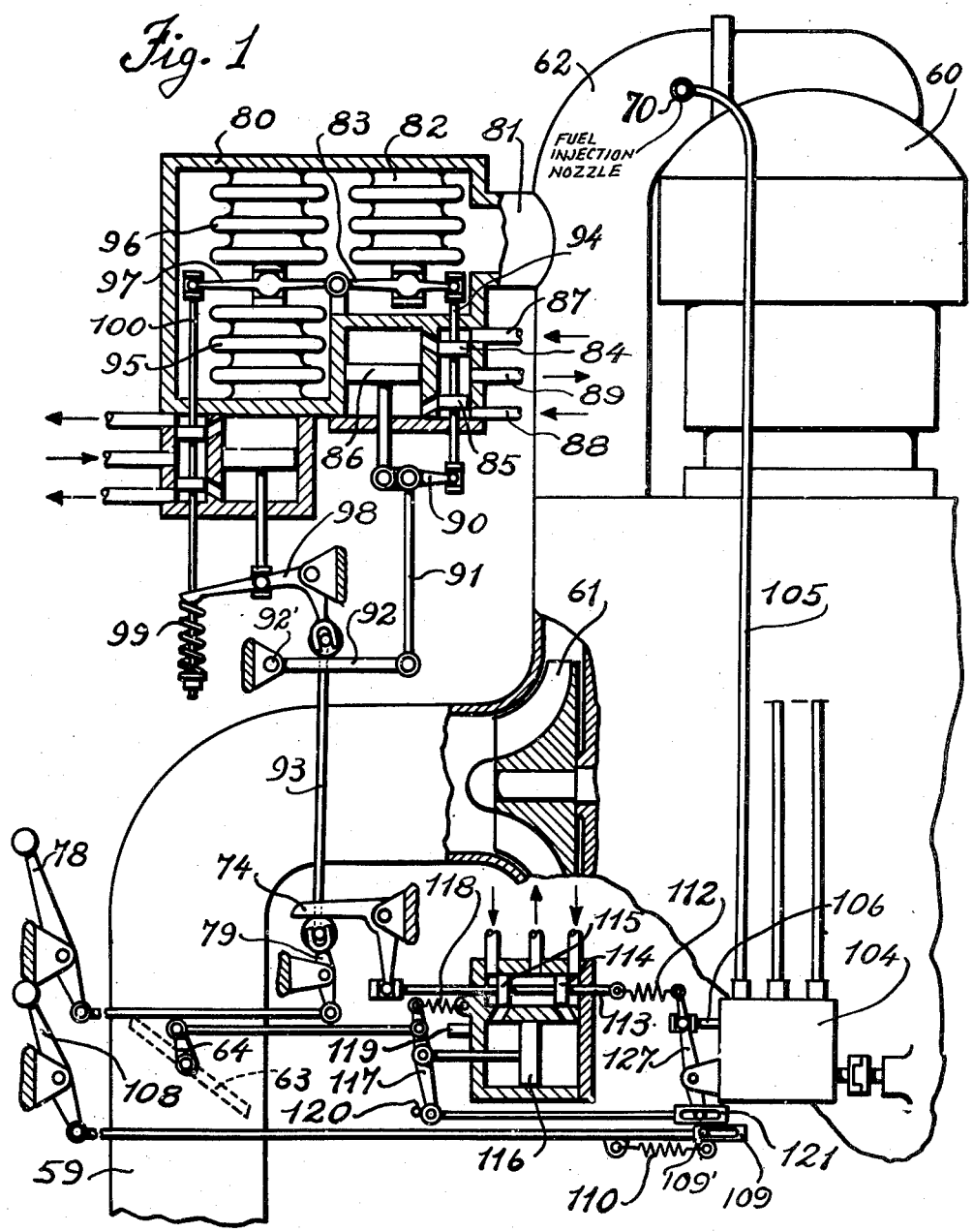

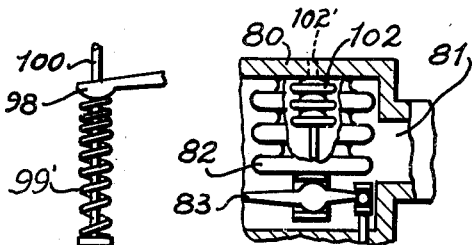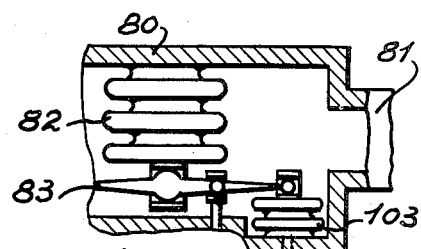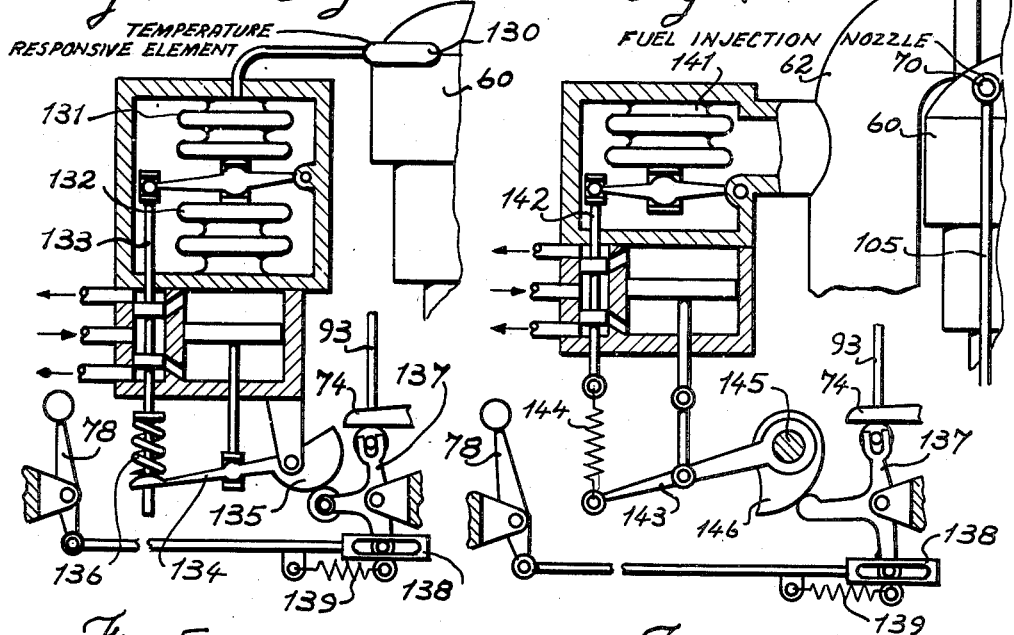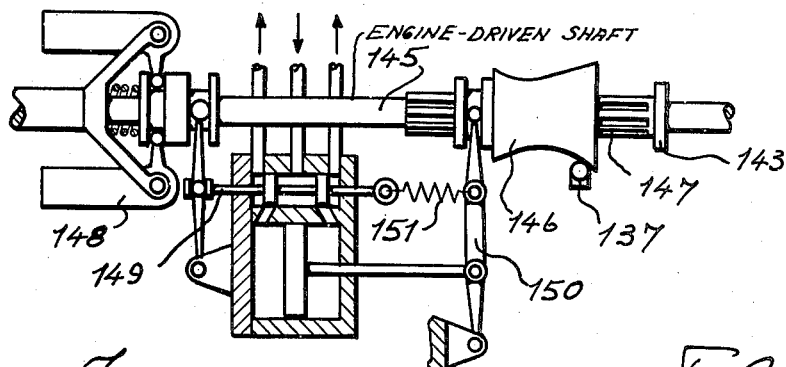

United States Patent Office 2,841,129
Patented July 1, 1958

2,841,129
ENGINE CONTROL SYSTEM

Ferdinando Carlo Reggio, Norwalk, Conn.

Application July 29, 1947, Serial No. 764,322, which is a division of application Serial No. 254,355, February 3, 1939. Divided and this application August 4, 1954, Serial No. 447,795

38 Claims. (Cl. 123—119)

This invention relates to mechanisms for controlling the air and fuel supplies of thermal powerplants, and more particularly to devices for automatically regulating the rate of air flow of such powerplants in accordance with variations in the rate of fuel flow thereof and changes in certain operating conditions of the powerplant so as to maintain at all times preselected optimum proportion between the fuel and the air composing the combustible mixture. The present application is a division of my co-pending patent application Serial No. 764,322 filed July 29, 1947, which is a division of Serial No. 254,355 filed February 3, 1939, both now abandoned.

An object of the invention is to provide improved devices of the type indicated.

Another object is to provide improved devices for variably controlling the engine air supply in response to changes in certain engine operating conditions.

Still another object is to provide an integrated control for coordinating engine air flow and engine fuel flow automatically according to predetermined schedules.

Further objects of the invention will be apparent from the following description, taken in connection with the appended drawings, in which:

Figure 1 is a diagrammatic sectional view of a device embodying the invention;

Figure 2 is a fragmentary view of a modified form of spring which may be substituted for the corresponding spring shown in Figure 1;

Figures 3 and 4 are fragmentary sectional views showing partial modifications of Figure 1;

Figure 5 is a fragmentary diagrammatic sectional view of another modified form of the invention;

Figures 6 and 7 are fragmentary diagrammatic sectional views of another modified form of the invention.

Figure 8:
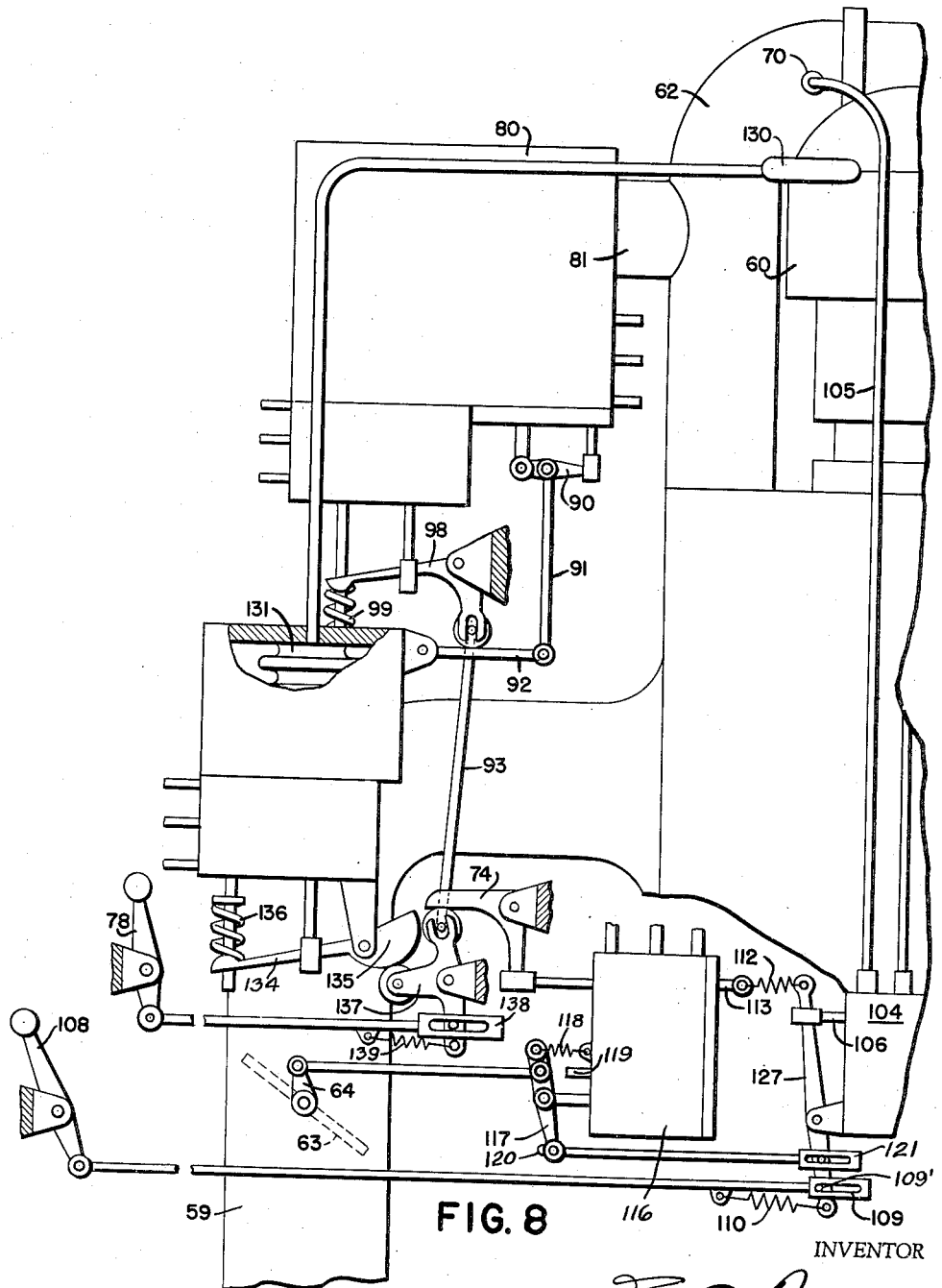
Figure 8 is a diagrammatic view of the device of Figure 1 modified according to Figure 5.

Although it is disclosed by way of example in connection with a reciprocating engine, the invention is in no way limited to use with such engines, but may be practiced in connection with any suitable combustion engine, thermal powerplant and the like, that is, with any installation provided with an air supply system, a fuel supply system, and requiring control means for suitably regulating the ratio between air flow and fuel flow.

Referring more specifically to the drawings, the arrangement disclosed in Figure 1 comprises an engine 60 having an induction passage 59 communicating with the inlet side of a supercharger or compressor 61 of any suitable type, which in turn leads to an induction pipe 62 and thence to the inlet port, not shown, of the engine. The passage 59 is controlled by a throttle valve 63 actuated through a lever 64.

A casing 80, communicating through a large duct 81 with the induction pipe 62, contains air at induction pressure and temperature. An evacuated bellows 82 in said casing acts on lever 83 to operate rod 94 and pilot valve 84, 85 which controls admission of oil under pressure, usually led from the engine lubricating system through pipes 87 and 88 as indicated by the arrows, to opposite sides of piston 86. Low pressure oil is returned to the engine sump through line 89. A floating lever 90 is connected at its ends with rod 94 and piston 86, and at an intermediate point with rod 91 which is connected, through lever 92 and rod 93, with the horizontal arm of a bell-crank lever 74. To that end, the upper end of the rod 93 is provided with a pin upon which there is rotatably mounted a roller which is adapted to ride upon the upper side of lever 92. The position of the roller lengthwise with respect to lever 92 is determined by the adjustment of the bell-crank lever 98, whose lower arm is provided with a slot engaging the pin. Thus rotation of lever 98 varies the distance between the rod 93 and the fulcrum 92' of lever 92 and alters the ratio of the axial loads applied to the rods 91 and 93 under which the lever 92 is in equilibrium. Similarly, the lower end of the rod 93 is provided with another pin, which carries a roller riding upon the lower side of the horizontal arm of the bell-crank lever 74. This roller is positioned, lengthwise of lever 74, by means of a lever 79 (Figure 1) whose upper end has a slot engaging the pin. In the partial modification disclosed in connection with Figures 5 and 6, instead of the lever 79 there is provided a lever 137, which also serves variably to adjust the position of the lower roller lengthwise of lever 74. The lever 79 of Figure 1, or the lever 137 of Figures 5 and 6, operates to control the effective arm ratio of lever 74. Constant contact between the rollers at the ends of rod 93 and the levers 92 and 74 is maintained as a result of the upward load transmitted by bellows 82 to the free end of lever 92, and counterclockwise moment exerted on lever 74 by the tension spring 112.

Also enclosed within casing 80 there is a bellows 95 which contains a certain weight of gas or other suitable fluid at contant volume. The high velocity of the air flow in the induction manifold 62 as well as the pulsations of pressure therein determine eddy currents and turbulence within the large and short conduit 81 and casing 80, thus causing an active thermic exchange, by conduction and convection, between the air flowing in the manifold 62 and the bellows 95. Moreover the thermal capacity of the latter usually is, or may be made, extremely small. It follows that the fluid within bellows 95 is at all times maintained at the same temperature as the air in the pipe 62.

The absolute pressure within bellows 95 is therefore proportional to the absolute manifold or induction temperature. Bellows 95 and a similar and evacuated bellows 96 act against each other and on a lever 97 to operate the rod 100 of a servo mechanism similar to the servo motor 86. Engine lubricating oil is led thereto and evacuated therefrom as indicated by the arrows. The pressure of the air in casing 80 acts in opposite directions on bellows 95 and 96, thereby balancing out the effect of any pressure change therein, so that the load transmited to lever 97 by the two bellows is only dependent upon the induction or manifold temperature. The servo mechanism controlled by rod 100 acts on lever 98 to vary the angular adjustment of the lever and in turn the operating distance of the rod 93 from the fulcrum 92' of lever 92. A spring 99 balances the load transmitted by the bellows to rod 100 and is so designed that the operating distance of the rod 93 from the fulcrum 92' of lever 92 is proportional to the actual absolute manifold temperature. Any temperature change in said induction manifold operates bellows 95 and in turn the servo mechanism to rotate lever 98 and vary the load of spring 99 until the balance of rod 100 in its neutral position is restored. Thus the load on rod 93 is proportional to the absolute pressure and inversely proportional to the absolute temperature in the induction pipe 62, and therefore is directly proportional to the air density therein.

A control lever 78 is adapted to modify the angular setting of lever 79 and in turn alter the distance of the lower end of rod 93 from the fulcrum of lever 74.

The engine 60 is provided with a fuel feed, such for example as a conventional injection or metering pump 104 driven by the engine and comprising one or more pump elements connected by ducts or pipes 105 and nozzles 70 with the various engine cylinders. These nozzles 70 may be mounted in any suitable position, such as near the intake cylinder port or valve or inside the cylinder, as shown in Figure 6, or they may be mounted to inject fuel into the induction pipe 62 as shown in Figure 1.

The delivery of the engine fuel feed or metering pump 104 is dependent upon the adjustment of the control rod 106 which is actuated by a lever 127. This lever 127 is connected through a rod having a lost motion device such as an elongated slot 109 with the fuel control lever 108 which is operated by the pilot. The upper end of lever 127 is connected by means of a tension spring 112 to a rod 113 carrying valve elements 114 and 115 which control the admission of oil to opposite sides of the hydraulic servo motor piston 116. A tension spring 110 is provided which tends resiliently to maintain, against the action of spring 112, the pin 109' at the lower end of lever 127 applied against the left side of the slot 109 as shown in the drawing. Oil under pressure from the engine lubricating system is led to the servo motor 116 and is drained back to the engine sump as indicated by the arrows. In normal operation the rod 113 and valve elements 114, 115 are in neutral position and the load of the spring 112 is determined by the angular adjustment of lever 127. Clockwise rotation of the latter causes an increase of fuel delivery as well as an increase of the load transmitted by the spring 112 to the rod 113. This spring 112 is so designed that its load is proportional to the fuel delivery per cycle of the pump 104. A floating lever 117 is connected with piston 116, with lever 64 operating on the air throttle valve 63 and, through a lost motion device such as an elongated slot 121, with lever 127. A tension spring 118 tends to rotate the lever 117 clockwise, and stops 119, 120 limit its motion.

The bell-crank lever 74 has a horizontal and a vertical arm. The former is connected with the rod 93 and is therefore subject to a load which is proportional or substantially proportional to the engine induction air density or air charge per cycle, while the latter arm is connected with the rod 113 upon which the spring 112 exerts a load which is proportional to the engine fuel supply per cycle. As already stated, under steady operating conditions the rod 113 is in equilibrium in its neutral position. If the pilot rotates clockwise either the lever 108 to increase the fuel delivery (which increases the load of spring 112 proportionally), or lever 78 to decrease the fuel-air ratio (which decreases the distance between rod 93 and the fulcrum of lever 74 and therefore lowers the moment transmitted by bellows 82 through rod 93 to lever 74), or if the air charge per cycle decreases owing either to increasing altitude or increasing engine speed (in which latter case the regulating device 80 decreases the load transmitted to lever 74 by rod 93 proportionally), the rod 113 is displaced to the right to admit oil under pressure to the left side of the piston 116 and thereby rotate the lever 117 clockwise to open the air throttle valve 63 and increase the flow of air, which in turn increases the induction air density and the cylinder air charge, whereupon the regulator 80 causes the load transmitted by the rod 93 to the lever 74 to increase proportionally, thus moving the rod 113 back toward its neutral position. Displacement of piston 116 of the servo motor goes on until the balance of the rod 113 in its neutral position is again attained. This means that in the first case (where the pilot rotates the control lever 108 clockwise to increase the engine fuel supply), the combined actions of the servo motor devices 80 and 116 automatically open the throttle valve 63 to increase the engine air supply proportionally, thereby maintaining constant fuel-air ratio. In the second case (where the pilot rotates the mixture control lever 78 clockwise), the air charge is automatically increased so as to bring the fuel-air ratio to the lower value corresponding to the new setting of the lever 78. In the third case (where the air charge per cycle decreases owing to increasing altitude, or increasing engine speed and corresponding reduction in engine volumetric efficiency), said device automatically increases the opening of the throttle valve 63 to maintain the fuel-air ratio constant at the value corresponding to the setting of the mixture control lever 78. The device will obviously operate in the opposite way when the pilot rotates the lever 108 or the lever 78 counter-clockwise, when the altitude decreases, or when the engine speed decreases.

The operation of the bellows device 80 upon changes of engine induction air pressure and temperature may more specifically be set forth as follows: the evacuated resilient bellows 82 exerts on the rods 94, 91 and 93 upward loads which are proportional to the induction pressure. In normal operation the rod 94 with the control valves 84 and 85 is maintained in equilibrium in neutral position by a downward load of equal magnitude transmitted thereto from the calibrated spring 112 connected with the fuel metering pump 104. Thus for a given position of the temperature compensating lever 98 and a given setting of the manual control lever 78 the induction pressure and the load of spring 112 (and in turn the engine fuel supply) are proportional. If now the aircraft climbs to higher altitude the induction pressure about bellows 82 decreases, and with it decreases the upward load transmitted by the bellows to the rod 94, while the downward load transmitted thereto from the spring 112 remains unchanged.

Thus the bellows 82 expands, the rod 94 moves downward, and oil under pressure, admitted over piston 86, displaces the latter downward, causing counter-clockwise rotation of lever 74 which sets in motion the servo motor 116 and causes rotation of lever 117 in a direction to open the throttle valve 63, thereby increasing the engine air supply. As a result of the increasing induction pressure, the bellows 82 contracts and reverses the motion of the rods 94 and 113. Meanwhile the servo motor 116 continues to open the throttle valve 63 until the induction pressure about the bellows 82 resumes the initial value, whereupon the rods 94 and 113 attain their neutral positions and the servo motors 86 and 116 are brought to a stop.

On the other hand, if the density of the induction air in duct 62 decreases because of increasing air temperature therein, then the temperature responsive bellows 95 expands and sets in motion the depending servo motor which causes counter-clockwise rotation of lever 98 to increase the distance between the rod 93 and the fulcrum 92' of lever 92. Since the load exerted by bellows 82 upon rod 93 is inversely proportional to said distance, this decreases the load exerted by rod 93 on lever 74 and determines a movement of the rod 113 toward the right which sets the servo motor 116 in motion in a direction to open the throttle valve 63 and so increase the induction air pressure as to compensate for the increased temperature thereof and maintain the induction air density and therefore the engine air charge per cycle constant. As the induction pressure increases, so increases the load transmitted by bellows 82 through rod 93 to lever 74, and the rod 113 moves back toward neutral position, until the proper higher value of induction pressure is attained; at which time the rod 113 resumes its neutral position and the servo motor 116 comes to a stop.

It is thus clear that with the above described mechanism the pilot directly controls the engine fuel supply by means of lever 108, while the air supply is automatically adjusted to keep the fuel-air ratio at the value corresponding to the setting of the mixture control lever 78 regardless of variations of operating conditions such as changes of temperature and surrounding air pressure. However, as the fuel supply is increased, or high altitude is attained, the lever 117 may come into contact with the stop 119, in which position the air throttle valve 63 is wide open, before the rod 113 is led back to its neutral position, and the piston 116 will be further displaced to the right to rotate the levers 117 and 127 counter-clockwise and move the fuel control rod 106 to the left so as to decrease the fuel delivery until the fuel-air ratio assumes the value corresponding to the adjustment of lever 78 and the balance of rod 113 in its neutral position is attained. Inverse operation of the device will occur when either lever 108 or lever 78 are rotated counter-clockwise (to call for reduced fuel supply or richer mixture, respectively) or when the air charge per cycle tends to increase, as when diving to lower altitudes.

From the foregoing it will be appreciated that where the engine air charge per cycle, or weight of air actually present in the engine cylinder during the compression and power strokes, is proportional to the induction density, then the mechanism shown in Figure 1 gives for each setting of the mixture control lever 78 a corresponding constant fuel-air ratio.

In certain engines the air charge is inversely proportional not to the absolute induction temperature, but approximately to the square root thereof. To automatically maintain in such engines a constant value of fuel-air ratio for each setting of the mixture control lever 78, the mechanism of Figure 1 may be modified by the adoption of a spring 99', shown in Figure 2, whose deflection within the designed limits is proportional to the square root of the load; such for example as a coil spring having uniform diameter and non-uniform pitch so designed that within the operating range the number of free coils is inversely proportional to the spring deflection, whereby the distance between rod 93 and the fulcrum of lever 92 is proportional (and thereby the load on rod 93 is inversely proportional) to the square root of the absolute temperature in the induction pipe 62.

In engines in which the air charge is still a different function of the induction temperature, an automatically constant value of fuel-air ratio may be obtained either by providing resilient means 99' of suitable characteristic, or by establishing the suitable relation between rotation of lever 98 and distance of rod 93 from the fulcrum of lever 92 by means of a cam, substantially as shown in Figures 5 or 6.

Moreover, in certain engines, in particular those highly supercharged and having a large valve overlap, such as applied conveniently to injection engines wherein it is possible to secure scavenging of the combustion chamber without loss of fuel, the air charge or weight of air remaining in the engine cylinder during compression and power stroke is affected, for a given induction pressure, by the surrounding, or exhaust, pressure. To correct such influences so that the load on rod 93 be proportional to the air charge a comparatively small bellows, whose interior communicates with the surrounding atmospheric pressure, may be added to the pressure responsive bellows 82 of Figure 1, either within the evacuated bellows 82 as indicated by numeral 102 in Figure 3, or on opposite side of lever 83, as indicated by numeral 103 in Figure 4, its size and position being determined in accordance with the engine characteristics. The interior of bellows 102 or 103 may be vented to the atmospheric pressure by any obvious means, such for instance as a passage 102' or 103', respectively, provided in the wall of housing 80.

The arrangement described above in connection with Figure 1, in which the fuel-air ratio of the combustible mixture is adjusted manually by the pilot or operator through the mixture control lever 78 is not particularly suitable in connection with aircraft engines. According to the present invention, means responsive to one or more operative conditions, such for example as the induction manifold pressure, the manifold temperature, the engine speed, the atmospheric pressure, the engine temperature, are provided for controlling the engine air supply or the fuel-air mixture ratio automatically.

Operation of the engine 60 with "best economy" mixture is possible over a certain range of power, beyond which the engine cannot safely be operated without resorting to some additional enrichment of the mixture to suppress over-heating and detonation. A temperature responsive element 130, Figure 5, mounted at a suitable point of the engine such as a cylinder head or exhaust port, is connected with a bellows 131 placed to act against an evacuated bellows 132 so that changes in the pressure surrounding the bellows act in opposite directions on said two bellows and have no effect on their operation. Temperature changes about element 130 operate the bellows 131 and in turn the rod 133 of a servo mechanism, similar to those already described in detail, to control the angular adjustment of lever 134 and cam 135 and to vary the force of spring 136 acting on rod 133. An increase in temperature of element 130 lowers the rod 133 and in turn rotates lever 134 clockwise thereby increasing the load of spring 136 until the balance of rod 133 in its neutral position is restored. Cam 135 is adapted to operate lever 137 which has the same function as lever 79 previously described, so that for each value of the temperature of element 130 it determines a corresponding predetermined minimum possible value of the fuel-air ratio. Mixture control lever 78 and lever 137 are connected through a lost motion device such as an elongated slot 138 and a tension spring 139 whereby the lever 78, whatever its adjustment may be, does not oppose counter-clockwise rotation of lever 137 when the latter is rotated by cam 135. It will be clearly understood that in order to obtain the foregoing results the structure represented in Figure 5 may be combined with the mechanism of Figure 1 by eliminating from the latter the lever 79 and substituting therefor lever 137 and the structure indicated by numerals 130 to 135 in Figure 5. Such an arrangement is illustrated in Figure 8.

Moreover, according to the invention, in order to obtain a fuel-air mixture ratio which varies automatically as a predetermined function of other operative conditions, lever 79 of Figure 1 may be eliminated, and in substitution therefor there may be provided lever 137 actuated by a cam having two distinct ways of reversible adjustment, for example a slidable and rotatable cam 146 as shown in Figures 6 and 7, there being provided means responsive to engine operative conditions for adjusting said cam in said two distinct ways, whereby the mixture ratio may automatically be caused to vary as a predetermined function of two independent variables, said function being dependent upon the configuration of the cam.

The upper arm of lever 137 is connected with the lower end of rod 93, shown in Figure 1, for adjusting the effective length of lever 74, and has therefore the same function as the upper arm of lever 79. The lower arm of lever 137 has a lost motion connection with a rod 138 which may be actuated by way of the manual control member 78 of Figure 1. A third, horizontally extending arm of lever 137 of Figures 6 and 7 is actuated by the cam 146 which may be axially and angularly adjusted by engine condition responsive devices, shown in Figures 7 and 6 as mechanisms responsive to the engine speed and to the manifold air pressure or density, respectively. The automatic mixture ratio control device may thus include the mechanism of Figure 1 minus lever 79 in combination with the structure represented in Figures 6 and 7. The rod 93, shown in part in Figures 6 and 5, is of course the same as the rod 93 of Figure 1 and is actuated by the same structure as the rod 93 of Figure 1.

Figure 6 shows means for automatically regulating the fuel-air ratio as a function of the induction or manifold pressure, assuming the mixture control lever 78 to be in "lean" adjustment with rod 138 in the position shown in the drawing, thus permitting contact between the horizontal arm of lever 137 and the cam 146. A bellows 141, evacuated totally or in part and enclosed in a housing communicating with the engine induction pipe 62, operates rod 142 of a servo mechanism similar to those already described, whereby an increase in induction pressure raises rod 142 and causes lever 143 to be rotated counter-clockwise until the increased load of the tension spring 144 re-establishes the balance of rod 142 in its neutral position. Lever 143 is secured to an externally splined sleeve 147 rotatably mounted on an engine-driven shaft 145. The warped cam 146 is slidably but non-rotatably mounted with respect to sleeve 147, so that the angular setting of the cam is dependent on the induction pressure. If the bellows 141 is not completely evacuated, it is responsive to changes of surrounding temperature, such as the induction or manifold temperature; and the angular adjustment of cam 146 is accordingly altered upon variations of said temperature. The axial setting of cam 146 is determined by speed responsive means such as a governor 148 driven from the engine through the shaft 145. This governor 148 controls rod 149 of a servo mechanism whereby an increase in engine speed displaces rod 149 to the left and thus causes the lever 150 to be rotated clockwise until the increased force of tension spring 151 restores the balance of rod 149 in its neutral position. Cam 146 therefore determines for each value of induction pressure and engine speed a corresponding minimum possible value of fuel-air ratio. In the preferred embodiment the form of the cam is such that in the cruising range of induction pressure and engine speed combinations such minimum corresponds to the "best economy" mixture, while for combinations of engine speeds and induction pressures corresponding to higher power output the minimum possible value of fuel-air ratio will be higher than that corresponding to "best economy" mixture. Variation of fuel-air ratio as determined by cam 146 is obtained automatically if the mixture control lever 78 is adjusted for "lean" mixture, owing to the elongated slot 138 and spring 139, while further mixture enrichment may be obtained by rotating lever 78 counter-clockwise.

The foregoing embodiments of the invention have been described for purpose of illustration and not as a limitation of the scope of the invention. It is therefore to be especially understood that the invention is not limited to the specific embodiments shown, but may be used in various other ways, in connection with other mechanisms and regulators, that various modifications may be made to suit different requirements, and that other changes, substitutions, additions and omissions may be made in the construction, arrangement and manner of operation of the parts without departing from the limits or scope of the invention as defined in the following claims.

Where the claims are directed to less than all of the elements of the system disclosed, they are intended to cover possible uses of the recited elements in installations which lack the non-recited elements.

I claim:

1. Engine fuel supply control means; engine air supply control means; common servomotor means adapted to actuate each of said control means; and operatively interconnected manual control means and engine combustion air pressure and temperature responsive means for controlling said servomotor means to regulate the engine fuel and air supplies in preselected relation to the setting of said manual control means and said pressure and temperature.

2. Engine fuel supply control means; engine air supply control means; common servomotor means operating on said fuel and air control means to maintain the fuel to air ratio within a predetermined range; and manually operable control means and air pressure and temperature responsive means for controlling said servomotor means.

3. Engine air supply control means; engine fuel supply control means; and air pressure and temperature and engine speed responsive means operating on both of said control means to maintain a predetermined schedule of fuel to air ratio.

4. For an engine having an injection system, a control system including engine air supply control means; and manual control means, barometric pressure responsive means, induction air pressure responsive means, induction air temperature responsive means, engine speed responsive means, and a movable element whose position varies in preselected relation to the delivery of said injection system for actuating said air supply control means.

5. Engine control system including engine fuel supply control means; engine air supply control means; and induction air pressure, induction air temperature and atmospheric pressure responsive means adapted jointly to actuate said fuel and air control means to maintain the fuel to air ratio within a predetermined range.

6. Engine fuel supply control means; engine air supply control means; and atmospheric pressure responsive means, engine operative temperature responsive means and engine speed responsive means adapted jointly to actuate said fuel and air control means to regulate the fuel to air ratio.

7. For use with a combustion engine having an air induction system and an injection system, sensor means responsive to engine operating conditions for automatically regulating said injection system to vary the delivery thereof, an engine air supply control means; a movable element whose setting varies in predetermined relation to the delivery of said injection system; means for actuating said control means in accordance with the setting of said movable element; and additional means for actuating said control means, including temperature responsive means for sensing the temperature in said air induction system, pressure responsive means for sensing the pressure in said air induction system, and atmospheric pressure responsive means.

8. For use with a combustion engine having an injection system, an engine air supply control means; a movable element whose setting varies in predetermined relation to the delivery of said injection system; means for actuating said control means in accordance with the setting of said movable element; and additional means for actuating said control means, including temperature responsive means connected with the engine to sense an operating temperature thereof and atmospheric pressure responsive means.

9. For use with a combustion engine having an injection system, an engine air flow control means, a movable element whose setting varies in predetermined relation to the delivery of said injection system; means for actuating said control means in accordance with the setting of said movable element; and additional means for actuating said control means, including engine intake air temperature responsive means and engine speed responsive means.

10. For use with a combustion engine having an injection system, an engine air flow control means; a movable element whose setting varies in predetermined relation to the delivery of said injection system; means for actuating said control means in accordance with the setting of said movable element; and additional means for actuating said control means, including engine speed responsive means and atmospheric pressure responsive means.

11. In an engine control system, a manual control; a fuel control; an operative connection actuating the fuel control from the manual control; an air control; air pressure and engine temperature responsive means for actuating the air control; and means for actuating the air control with changes in the position of the fuel control.

12. In a fuel supply system for an aircraft engine, the combination with a throttle valve, of a pilot's control lever movable from a slow running position through a cruising range to a full power position, a variable datum boost control device for maintaining in the induction system a boost pressure corresponding to and selected by the position of said lever, means for supplying fuel and air to the engine, mixture control means for varying the fuel/air ratio of the mixture supplied to the engine, a servo mechaanism responsive to boost pressure and operative in response to a change in the selected boost pressure to adjust said mixture control means to give an economical mixture at cruising boost and a richer mixture for power when the boost pressure exceeds a given limit.

13. In a fuel supply system for an aircraft engine, the combination with a throttle valve, of a pilot's control lever movable from a slow running position through a cruising range to a full power position, a variable datum boost control device for maintaining in the induction system a boost pressure corresponding to and selected by the position of said lever, means for supplying fuel and air to the engine, mixture control means for varying the fuel/air ratio of the mixture supplied to the engine, a servo mechanism responsive to boost pressure, and a cam operated by said servo mechanism for adjusting the setting of the mixture control means in response to changes in boost pressure, said cam being shaped to provide an economical mixture at cruising boosts and a richer mixture when the boost pressure exceeds a given limit.

14. For use with a combustion engine having an air compressor, combustion air flow regulating means, and an injection system, a control device including a movable member whose setting varies in predetermined relation to the delivery of said injection system; a manually actuated control lever movable from an engine slow running position to a full power position; power means operating on said air flow regulating means; relay means controlling the power means; pressure responsive bellows; a passage through which the bellows may be subjected to air pressure in the engine induction system which is a measure of air flow; engine operating temperature responsive means; and an operative connection to actuate the relay means from the control lever, the bellows, the temperature responsive means and said movable member.

15. A fuel injector control system for an internal combustion engine comprising a fuel injection pump, an air conduit and a throttle therefor, means for manually controlling the delivery of the fuel pump, means for automatically controlling the throttle to vary the air flow as the fuel flow is varied, and means for limiting the fuel pump control, in the direction to increase the fuel flow, when said throttle reaches its full-open position.

16. A fuel injection control system for an internal combustion engine comprising means for injecting fuel into the cylinders of said engine, manually operable means for controlling the fuel flow from said injection means to said engine, an air passage for supplying combustion air to said engine, including a throttle for controlling the flow of air through said air passage, means for automatically controlling the flow of air through said air passage in proportion to said fuel flow, so as to maintain a desired fuel/air mixture ratio under varied operating conditions of said engine, and means for limiting the opening movement of said manually operable means when said throttle reaches full-open position.

17. For a thermal powerplant having a combustion chamber and conduit means connecting the combustion chamber to the atmosphere: first means movable to provide a variable flow area in said conduit means; second means for variably adjusting the first means; reversible motor means to actuate the second means; control means for the motor means; and engine speed responsive means, atmospheric pressure and induction air pressure responsive means, induction air temperature responsive means and a manually operable control lever movable from an engine slow running position to a full power position operatively connected with said control means to actuate the same automatically.

18. For an engine having a combustion chamber, conduit means connecting the combustion chamber to the atmosphere, first means providing a variable flow area in said conduit means, and second means for variably adjusting the first means; a reversible motor for actuating the second means; motor control means; a power control member movable from an engine slow running position to a full power position; an engine fuel system having fuel regulating means movable to control the engine fuel supply; induction air pressure responsive means and means responsive to temperature in the engine air induction system; and an operative connection for actuating said motor control means from said power control member, said fuel regulating means and said air pressure and temperature responsive means to vary the flow area in said conduit means automatically as a predetermined function of the setting of said power control member, of the engine fuel supply and of said air pressure and temperature.

19. For an engine having at least one combustion chamber, conduit means connecting the combustion chamber to the atmosphere, first means providing a variable flow area in said conduit means, and second means for variably adjusting the first means: a reversible motor to actuate the second means; motor control means; an engine liquid fuel supply system; means connected with said fuel system for actuating said motor control means upon changes in the rate of fuel supply; and means responsive to a pressure appurtenant to engine operation, means responsive to a temperature affecting engine operation, and means responsive to changes of engine speed for actuating said motor control means.

20. In or for a thermal propulsion powerplant: air supply control means; fuel supply control means; a control member movable from a low power output to a full power output position; barometric pressure and engine induction air pressure and temperature responsive means; and reversible motor means actuated by said control member and said pressure and temperature responsive means and adapted to operate on said air and fuel supply control means.

21. In or for a thermal powerplant having a combustion air compressor, valve means for regulating the powerplant air flow, and an injection system, a control device including a movable member whose adjustment varies in predetermined relation to the delivery of said injection system; a manually controllable lever movable from a powerplant low power output position to a full power position; a servo motor operating on said valve means; a servo motor control means; engine speed responsive means; first and second pressure responsive means; a passage through which the first pressure responsive means may be subjected to the pressure on the discharge side of the compressor; another passage through which the second pressure responsive means may be subjected to air pressure varying with the altitude; and an operative connection actuating the servo motor control means from said manually controllable lever, movable member, speed responsive means and first and second pressure responsive means.

22. In or for a powerplant having an air intake passage, valve means in said passage, and a fuel supply system having fuel flow control means: a control system comprising reversible motor means; motor control means actuating said motor means; pressure and temperature responsive means and manually operable means connected to actuate said motor control means; and an operative connection including a lost-motion device for actuating said valve means and said fuel flow control means in predetermined sequence from said reversible motor means.

23. In regulating apparatus for a prime mover having an air intake system, the combination of first control means arranged to vary the rate of air flow thereto, control means including servomotor means adapted for connection with said first control means to operate the same and actuated by a device responsive to change of a speed condition in said prime mover, control means including servomotor means actuated by temperature responsive means sensing temperature variations in a portion of said prime mover, control means arranged to be responsive to manual supervision, and means for interconnecting all of said control means.

24. In a regulating apparatus for an air-consuming prime mover, the combination of first control means arranged to vary the rate of air flow thereto, control means including servomotor means adapted for connection with said first control means to actuate the same and in turn actuated by a device responsive to change of speed in said prime mover, control means including servomotor means actuated by temperature responsive means sensing variations of temperature in a portion of said prime mover, control means including servomotor means actuated by temperature responsive means sensing changes of a different temperature in another portion of said prime mover, and means for interconnecting all of said control means.

25. Control mechanism comprising a housing having a chamber subject to a variable pressure; a first bellows disposed within said chamber, externally subject to said variable pressure and movable in response to changes of said pressure, said first bellows being sealed; a second bellows disposed within said chamber co-axially with said first bellows, said second bellows being vented to atmospheric pressure and movable in response to variations of said atmospheric pressure; means connecting one end of said first bellows with one end of said second bellows for simultaneous movement of their connected ends; and a control member operatively connected with said two bellows to be actuated thereby upon changes in the pressure within said chamber and upon variations of atmospheric pressure.

26. In a regulator for a fluid pressure; a housing having a chamber subjected to said fluid pressure; a first bellows and a second bellows both disposed within said chamber and externally subjected to said fluid pressure; one of said bellows being sealed and the other bellows being vented to the atmospheric pressure; means connecting one end of said first bellows with one end of said second bellows for simultaneous movement of said connected ends; and means including a member operatively connected with said bellows to be actuated by changes of said fluid pressure and also by variations of atmospheric pressure for controlling said fluid pressure.

27. In engine control apparatus, the combination with fuel flow control means and air flow control means, of common servomotor means adapted to actuate either of said flow control means to maintain the fuel to air ratio within a predetermined range, means for automatically transferring operation of the servomotor means from one to the other of said flow control means, and manually operable means, air pressure responsive means and engine temperature responsive means for controlling said servomotor means.

28. An engine control system including air flow control means; fuel flow control means; air pressure, temperature and engine speed sensors for actuating both of said flow control means to maintain a predetermined schedule of fuel to air ratio; and means for shifting the effect of said sensors from one to the other of said flow control means.

29. In an engine control system, fuel flow control means and air flow control means; a sensor device responsive to engine operating pressure, a sensor device responsive to engine operating temperature, and a sensor device responsive to engine speed adapted jointly to actuate said fuel flow control means and said air flow control means; and means for automatically transferring the operation of said sensor devices from one of said flow control means to the other.

30. Control apparatus for an engine having an air induction system and a fuel supply system, including fuel flow control means, air flow control means, means subject to manual supervision operatively connected with said fuel flow control means for selecting the engine fuel flow, means for automatically actuating said air flow control means to regulate the air flow in preselected relation to the fuel flow, and means for rendering the manual means ineffective and limiting the fuel flow control means, in the direction to increase the flow of fuel, when the air flow control means reaches the maximum flow position.

31. In control apparatus for an engine having fuel flow control means for regulating the flow of fuel to the engine and air flow control means for varying the flow of air to the engine, a first positioning member adapted to be connected to the fuel flow control means, a second positioning member adapted to be connected to the air flow control means, a manually controlled member, a lost motion mechanical connection between said manually controlled member and said first positioning member, a motor connected to said first positioning member for positioning the same within the range of lost motion provided by said connection, means for connecting said motor to the second positioning member to vary the position thereof and cause variation in the air flow to the engine, means for transferring the controlling effect of the motor from one of said positioning members to the other, and means for remotely controlling said motor.

32. In control apparatus for an engine having fuel flow control means for regulating the flow of fuel to the engine and air flow control means for varying the flow of air to the engine, a first positioning member adapted to be connected to the fuel flow control means, a second positioning member adapted to be connected to the air flow control means, a manually controlled member, a lost motion connection between said manually controlled member and said first positioning member, a motor connected to said first positioning member for positioning the same within the range of lost motion provided by said connection, means for connecting said motor to the second positioning member to vary the position thereof and cause variation in the air flow to the engine, means for transferring the controlilng effect of the motor from one of said positioning members to the other, and means adapted to respond to a condition affecting engine operation for controlling said motor.

33. In control apparatus for an engine having fuel flow control means for regulating the flow of fuel to the engine and air flow control means for varying the flow of air to the engine, a first positioning member adapted to be connected to the fuel flow control means, a second positioning member adapted to be connected to the air flow control means, a manually controlled member, a lost motion connection between said manually controlled member and said first positioning member, a motor connected to said first positioning member for positioning the same within the range of lost motion provided by said connection, means for connecting said motor to the second positioning member to vary the position thereof and cause variation in the air flow to the engine, means for transferring the controlling effect of the motor from one of said positioning members to the other; means adapted to respond to a condition affecting engine operation for controlling said motor, and means positioned by said manually controlled member for varying the control point of said last named means.

34. In control apparatus for an engine having fuel flow control means for regulating the flow of fuel to the engine and air flow control means for varying the flow of air to the engine, a first positioning member adapted to be connected to the fuel flow control means, a second positioning member adapted to be connected to the air flow control means, a manually controlled member, a lost motion mechanical connection between said manually controlled member and said first positioning member, a motor connected to said first positioning member for positioning the same within the range of lost motion provided by said connection, means for connecting said motor to the second positioning member to vary the position thereof and cause variation in the air flow to the engine, means for transferring the controlling effect of the motor from one of said positioning members to the other, means adapted to respond to a condition affecting engine operation for controlling said motor, spring means associated in biasing relation with said condition responsive means, and connecting means between said manually controlled member and said spring means for varying the biasing action of said spring means to vary the control point of said condition responsive means.

35. In control apparatus for an engine, the combination with first control means for regulating the flow of fuel to the engine and second control means effective to cause variation in the air flow to the engine, of a sensor device responsive to an engine operating condition, means for connecting the sensor device in controlling relation either with said first control means or with said second control means, and means for automatically transferring the controlling effect of the sensor device from one of said control means to the other.

36. In control apparatus for an engine, the combination with first control means for regulating the flow of fuel to the engine and second control means effective to cause variation in the air flow to the engine, of a sensor device responsive to a parameter of engine operation, means for connecting the sensor device in controlling relation with said first control means or said second control means, and transfer means effective upon the occurrence of a predetermined engine operating condition to shift the controlling effect of the sensor device from one to the other of said control means.

37. In control apparatus for an engine, the combination with first control means for regulating the flow of fuel to the engine and second control means effective to cause variation in the air flow to the engine, of a sensor device responsive to an engine operating temperature, means for connecting the sensor device in controlling relation either with said first control means or with said second control means, and means for automatically transferring the controlling effect of the sensor device from one of said control means to the other.

38. In control apparatus for an engine, the combination with first control means for regulating the flow of fuel to the engine and second control means effective to cause variation in the air flow to the engine, of sensor devices responsive to a plurality of engine operating temperatures, means for connecting the sensor devices in controlling relation with said first control means or said second control means, and transfer means effective upon the occurrence of a predetermined engine operating condition to shift the controlling effect of the sensor devices from one to the other of said control means.

References Cited in the file of this patent

UNITED STATES PATENTS

| | | |
|---|---|---|
| 2,205,354 | Gregg et al. | June 18, 1940 |
| 2,245,562 | Becker | June 17, 1941 |
| 2,382,707 | Gosslau et al. | Aug. 14, 1945 |